March 1, 1966     J. MERCIER     3,237,248
MOLD FOR ELONGATED BLADDER OF PRESSURE VESSEL
Filed May 19, 1964     2 Sheets-Sheet 1

INVENTOR
Jean Mercier
BY
Dean, Fairbank & Hirsch
ATTORNEYS

March 1, 1966  J. MERCIER  3,237,248
MOLD FOR ELONGATED BLADDER OF PRESSURE VESSEL
Filed May 19, 1964  2 Sheets-Sheet 2

INVENTOR
Jean Mercier
BY
ATTORNEYS

United States Patent Office 3,237,248
Patented Mar. 1, 1966

3,237,248
MOLD FOR ELONGATED BLADDER OF
PRESSURE VESSEL
Jean Mercier, 1185 Park Ave., New York, N.Y.
Filed May 19, 1964, Ser. No. 368,548
1 Claim. (Cl. 18—36)

This application is a continuation-in-part of copending application Serial No. 42,378, filed July 12, 1960 (now Patent No. 3,138,176, dated June 23, 1964), which was a division of application Serial No. 494,139, filed March 14, 1955 (now Patent No. 2,947,326, dated August 2, 1960).

This invention relates to the art of pressure devices, more particularly to the type known as pressure accumulators.

As conductive to an understanding of the invention, it is noted that where such accumulators are of large size requiring a relatively long bladder between the two fluids under pressure contained therein, in the formation of such an elongated bladder, where a long core member is used during the molding process, it is likely to shift radially at its free end with respect to the mold recess with the result that a portion of the bladder wall will be thinner than the adjacent portion, providing a weak area that is likely to rupture when the bladder is in use.

Where a rod is used that extends through the base of the mold into the core to guide the latter, and the resultant opening in the completed bladder is filled with a plug of bladder material, the resultant plugged opening provides a region of weakness which, when subjected to strain, is likely to break down with resultant rupture of the bladder.

It is accordingly among the objects of the invention to provide a mold for forming a bladder for a pressure accumulator of the type having a relatively long bladder therein, having an axial opening in the bottom thereof, with an insert therein which in use of the bladder, will not be subjected to undue stress or strain with resultant likelihood of breakdown in the region of such insert.

According to the invention, these objects are accomplished by the arrangement and combination of elements hereinafter described and particularly recited in the claim.

Figure 2:
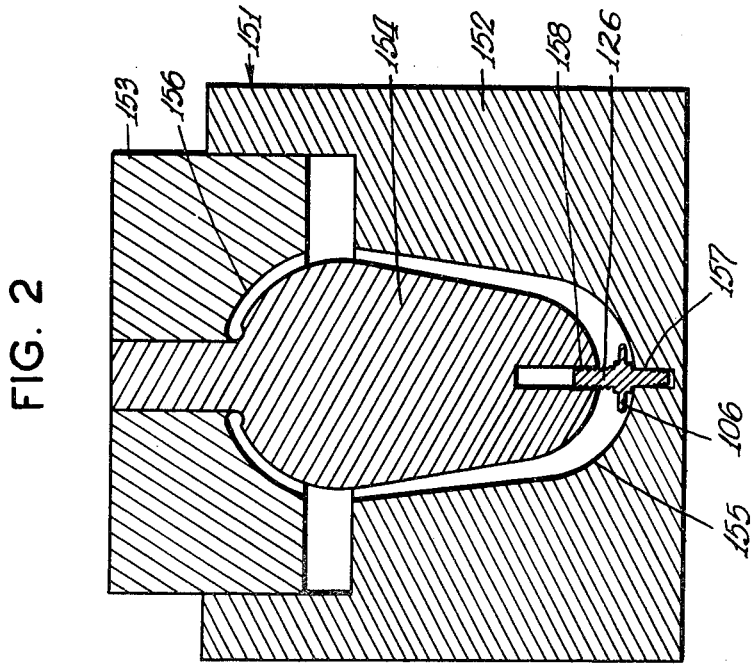
Figure 1:
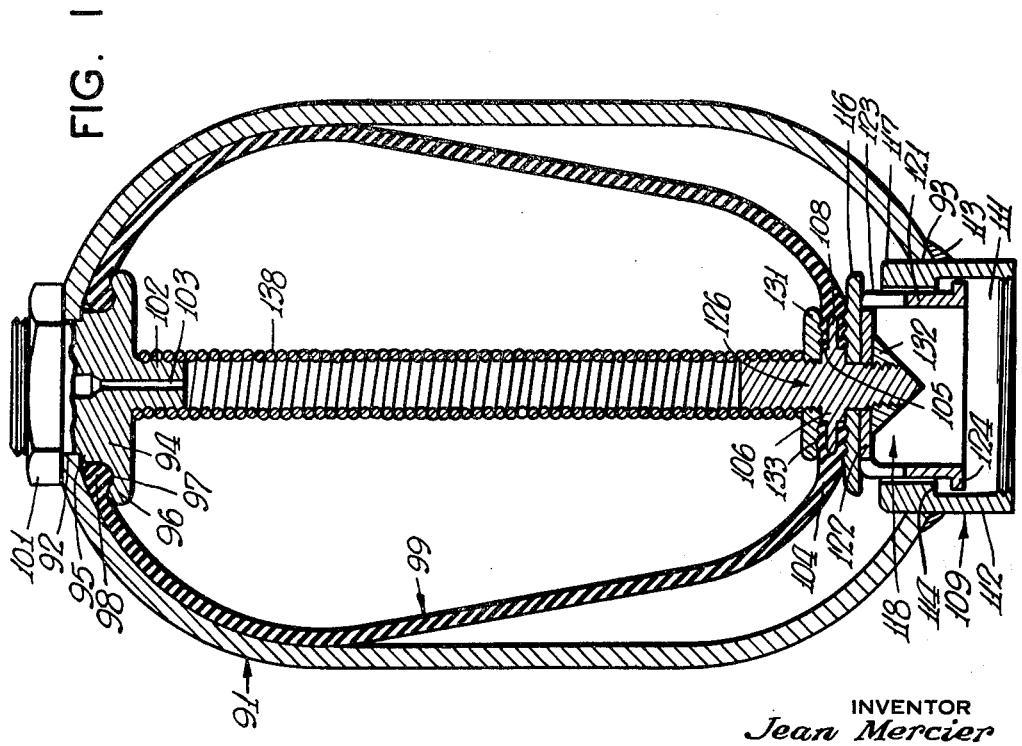
Figure 3:
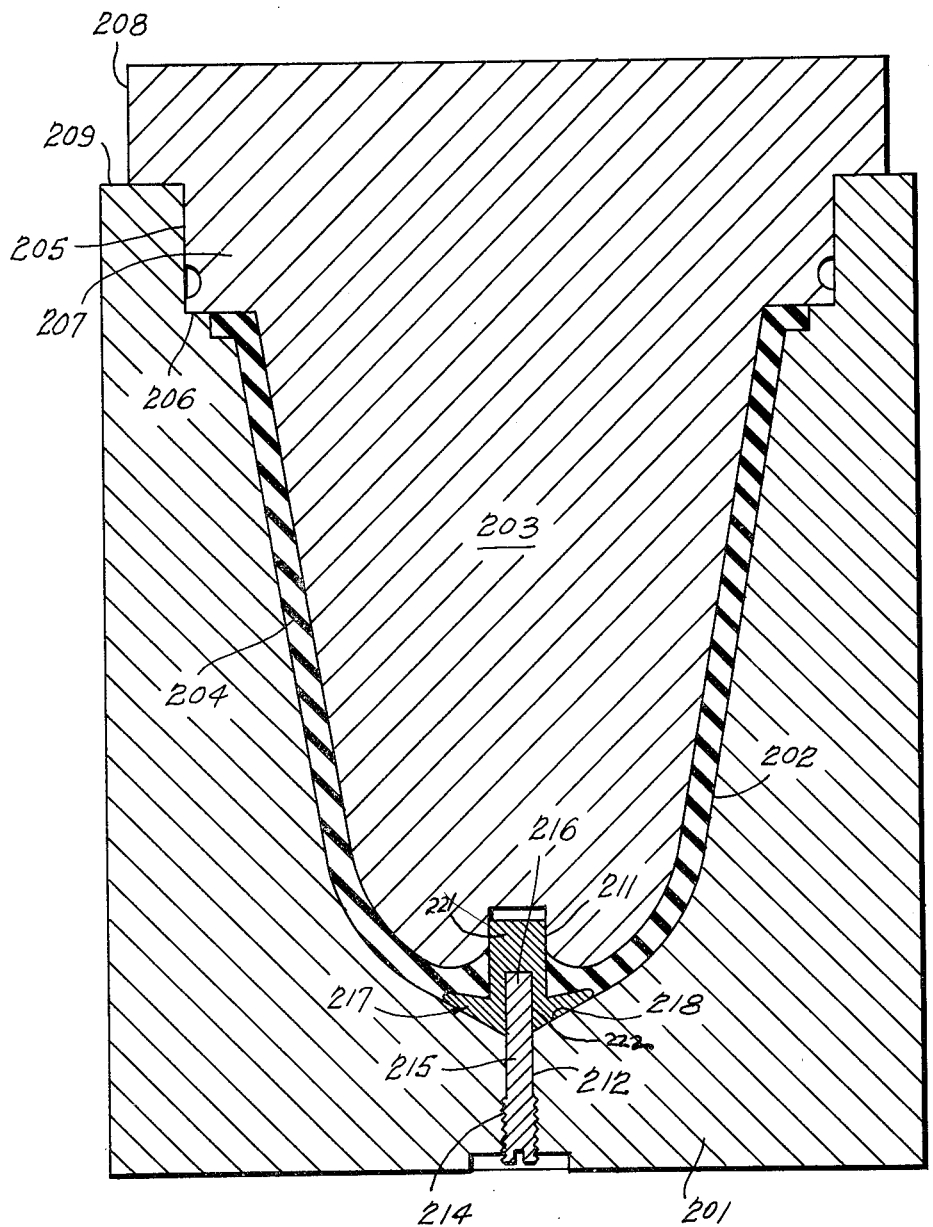

In the accompanying drawings in which are shown one or more of various possible embodiments of the several features of the invention, FIG. 1 is a longitudinal sectional view of an accumulator incorporating a bladder made according to one embodiment of the invention, FIG. 2 is a longitudinal sectional view of a mold for forming the bladder shown in FIG. 1, and FIG. 3 is a view similar to FIG. 2 of another embodiment of the invention.

Referring now to the drawings, the pressure accumulator shown in FIG. 1 comprises a container 91 of strong rigid material capable of withstanding high pressures and having axially aligned openings 92 and 93 at its opposed ends.

Mounted in opening 92 is a plug 94 having an annular shoulder 95 adapted to seat against the inner periphery of said opening. The plug 94 has a lateral flange 96 with an annular depression 97 therein to receive the thickened rim 98 of the mouth of a deformable substantial conical bladder 99. Thus, when a nut 101 screwed on the threaded end of plug 94 extending beyond opening 92, is tightened, the rim 98 of the bladder will be clamped between flange 96 and the wall of the container around opening 92 securely to hold the rim in place, the shoulder 95 preventing excessive pinching of such rim.

The plug 94 desirably has an axial nipple 102 on its inner surface and a passageway 103 extends through said plug and said nipple so that gas under pressure may be forced through said passageway into said bladder to charge the latter.

Mounted in opening 93 of the container 91 is a closure assembly 109 defining a port 111 through which a fluid under pressure, such as oil, may flow into and out of the container.

The closure assembly illustratively comprises a tubular member or sleeve 112 of diameter such that it may readily fit into opening 93. Although the tubular member 112 may be retained in position in opening 93 in any suitable manner, it desirably is welded in place as at 113.

The bore of tubular member 112 which defines the port 111, is of enlarged internal diameter at its outer end defining an annular shoulder 114 and such enlarged diameter portion is internally threaded to receive the correspondingly threaded end of a coupling (not shown) to which a hydraulic line may be connected.

Positioned in the container 91 is a valve head 116 of diameter greater than that of the bore in tubular member 112 and designed to seat against the inner end 117 thereof to cut off flow of fluid from the container.

Means are provided to guide the valve head 116 so that it will move axially with respect to tubular member 112. Such means desirably comprises a guide member 118 which may be substantially cup-shaped as shown and of outer diameter just slightly less than that of the smaller diameter portion of bore 111 so that it may readily slide therethrough but with substantially no transverse play. The side wall 121 of guide member 118 near its end wall 122 has a plurality of openings 123 through which fluid may flow, when valve head 116 is in open position. The guide member 118 desirably has an outwardly extending flange 124 which will abut against shoulder 114 to limit the inward movement of said guide member, and which will also impart a damping action to such inward movement as liquid is forced into the container.

Although the valve head may be affixed to the guide member in any suitable manner, in the embodiment shown, a rod 126 threaded at both ends extends through axially aligned openings in the end wall 122 of the guide member 118 and the valve head 116 and through an opening 105 in the end 104 of the bladder 99 opposed to the mouth of the latter. The rod 126 has a collar 106 desirably formed integrally therewith of substantially the same thickness as the bladder wall and an annular flange 108 preferably formed integrally with the collar extends laterally outward therefrom. The collar 106 and flange 108 are molded integrally with the bladder, said flange having a layer of bladder material on each surface thereof. Nuts 131 and 132 are screwed on the threaded ends of said rod to clamp the valve head 116 and the guide member 118 together.

The nut 131 and the valve head 116 at the periphery of the openings therein will abut against the collar 106 to prevent undue pinching of the bladder 104 adjacent the openings 105 therein and the opposed surface of said nut 131 and the valve head 116 have outstanding bosses 133 securely to grip the bladder to reduce lateral strain against the flange 108 which might break the bond of the bladder thereto.

The nut 132 is desirably conical, as shown, to deflect the liquid forced into the tubular member 112 so that it will flow toward openings 123 without severe impact against the undersurface of the end wall 122 of the guide member 118.

Resilient means are provided normally to retain the valve head in open position. Such means desirably comprises a coil spring 138 extending centrally through bladder 104 and affixed at its respective ends to nipple 102 and to rod 126. Under normal conditions with the accumulator uncharged, the spring 138 will retain the valve head in open position, the inward movement of such valve head being limited by the abutment of flange 124 against shoulder 114.

After the bladder and container are charged with gas and oil under pressure, the deformed bladder will be retained in the center of the container by the coil spring 138 so that it will not rub against the wall of the container with resultant rupture and will not form sharp folds which are also likely to cause rupture of the bladder.

When a valve (not shown) controlling port 111 is opened, the compressed gas in bladder 104 will cause the latter to expand, forcing oil out of the container through openings 123 in the guide member. As the bladder expands, by reason of its conical shape, as previously described with respect to the embodiment of FIG. 2, no oil pockets will be provided and substantially all the oil will be forced out of the container.

With continued expansion of the bladder, sufficient force will be exerted against valve head 116 to overcome the tension of coil spring 138 so that the valve head will seat against the end 117 of tubular member 112, stopping flow from the container and precluding extrusion of the bladder.

By reason of the bonding of the flange 108 in the opening 105 of the bladder and the clamping action of nut 131 and valve head 116, the rod 126 will remain securely affixed to the bladder without likelihood of breakage of such bond. Hence the accumulator is not likely to break down, even with long use.

The bladder shown in FIG. 1 may be formed by means of the mold 151 shown in FIG. 2. The mold desirably comprises a base 152, a cover member 153, and a core 154. The base and the cover member each has a recess 155 and 156 therein which, when juxtaposed, conforms to the desired substantially conical configuration of the bladder. To prevent transverse displacement of the lower end of the core with respect to the recess in the mold, an axial bore 157, 158 is provided in the base and said core in which the rod 126 may be positioned.

To form the bladder with the mold shown in FIG. 2, the rod 126 is positioned in recess 155 so that it extends into the bore 157 therein, the collar 106 resting on the periphery of said bore 157. A predetermined charge of material from which the bladder is formed is placed in the recess 155, the core 154 is then placed in the recess 155 being guided by the rod 126 which extends into the axial bore 158 in said core. The cover member 153 and the core 154 are then forced downwardly as by means of a hydraulic press. As a result, the material in recess 155 will rise to fill the space between the recess wall and the core to form the bladder which is then cured in conventional manner.

In the embodiment shown in FIG. 3, the mold comprises a base 201 having a recess 202 therein in which a core 203 is positioned, the space 204 between the recess 202 and the core conforming to the desired configuration of the bladder.

The recess 202 has an enlarged diameter portion 205 at its upper end defining an annular shoulder 206 on which it is seated the head 207 of the core 203, said head having an enlarged diameter portion 208 seated on the upper end 209 of the base to define a cover for the recess 203.

To prevent transverse displacement of the lower end of the core 203 with respect to the recess 202 in the mold, aligned axial bores 211, 212 are provided in the core 203 and base 201, the bore 212 extending through the floor of the base 201 and being internally threaded as at 214 to receive the corresponding threaded end of a guide rod 215 which protrudes as at 216 into the recess 202.

Adapted to seat on the lower end of the recess 202 is a valve head 217 the bottom surface of which is substantially conical as at 218 to conform to the complementary configuration of the lower end of recess 202. The valve head 217 has an axial stem 221 which fits with substantially no play into the bore 211 in the core and an axial bore 222 extends into the valve head to receive the protruding end 216 of rod 215 which fits into bore 222 with substantially no play.

To form the bladder with the mold shown in FIG. 3, the valve head 217 is positioned in the recess with the end 216 of pin 215 positioned in bore 222 of the valve head. A predetermined charge of material from which the bladder is formed is placed in the recess 202 and the core 203 is then positioned in the recess so that the valve stem 221 is positioned in bore 211 of the core. The core 203 is then forced downwardly as by means of a hydraulic press reacting against the cover 208 until the lower end of the head 207 abuts against shoulder 206.

The downward movement of the core 203 will cause the material in recess 202 to rise to fill the space 204 between the recess wall and the core to form the bladder which is then cured in conventional manner, the bladder material in engagement with the stem 221 and the upper surface of the valve head bonding thereto.

In order to clean the mold after the finished bladder is removed, the pin 215 may readily be removed by unscrewing from bore 212.

Thus, in all of the embodiments shown, the core of the mold to make the elongated bladder is guided during the molding process and the hole in the bladder resulting from the core guiding means is sealed by an insert such as the rod 126 of FIG. 1 or the valve stem 221 of FIG. 3. As such inserts are bonded in place during the molding operation, they will remain in position much more securely than if they were inserted after the bladder had been formed.

As many changes could be made in the above constructions, and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desired to secure by Letters Patent of the United States is:

A mold comprising a base having a symmetrical recess with a curved bottom wall, a core in said recess, a cover member for said recess to close the latter, a guide member having axially aligned guide portions, said base and said core having complementary axially aligned guide portions, coacting respectively with the guide portions of said guide member, to center said core in said recess, said guide member having lateral extensions and having shoulder means engaging the surface of the curved recess adjacent the periphery of the guide portion thereof to position said lateral extensions so that they are spaced from the bottom surface of the recess in said base.

References Cited by the Examiner

UNITED STATES PATENTS

| 333,469 | 12/1885 | Kipper. |
| 2,158,044 | 5/1939 | Haller _____ 18—34 XR |
| 2,558,027 | 6/1951 | Wilson _____ 18—2 XR |
| 2,604,660 | 7/1952 | Karns. |
| 2,677,855 | 5/1954 | Mallory _____ 18—36 XR |
| 2,958,101 | 11/1960 | Guggenheim et al. __ 18—36 XR |
| 3,045,290 | 7/1962 | Anderson et al. |
| 3,128,504 | 4/1964 | Gewecke _____ 18—36 |
| 3,135,999 | 6/1964 | Calderwood et al. _____ 18—36 |

FOREIGN PATENTS

| 962,726 | 12/1949 | France. |

J. SPENCER OVERHOLSER, *Primary Examiner.*

WILLIAM J. STEPHENSON, *Examiner.*